(12) United States Patent
Yeum (10) Patent No.: US 9,827,630 B2
(45) Date of Patent: Nov. 28, 2017

(54) FIXING APPARATUS FOR RESPOT WELDING

(71) Applicant: Hyundai Motor Company, Seoul (KR)

(72) Inventor: Jung Whan Yeum, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/960,424

(22) Filed: Dec. 6, 2015

(65) Prior Publication Data

US 2017/0057021 A1    Mar. 2, 2017

(30) Foreign Application Priority Data

Sep. 1, 2015    (KR) .......................... 10-2015-0123726

(51) Int. Cl.
| | | |
|---|---|---|
| *B23K 11/11* | (2006.01) | |
| *B23K 37/04* | (2006.01) | |
| B23K 101/00 | (2006.01) | |
| B23K 101/18 | (2006.01) | |
| B23K 103/04 | (2006.01) | |

(52) U.S. Cl.
CPC ........ *B23K 11/115* (2013.01); *B23K 37/0443* (2013.01); *B23K 37/0461* (2013.01); *B23K 2201/006* (2013.01); *B23K 2201/18* (2013.01); *B23K 2203/04* (2013.01)

(58) Field of Classification Search
CPC ......... B23K 11/10; B23K 11/11; B23K 11/36; B23K 11/364; B23K 2201/006; B23K 37/0426; B23K 37/0443; B23K 37/0461; B23Q 3/18; B62D 65/18
See application file for complete search history.

(56) References Cited

U.S. PATENT DOCUMENTS

| | | | | |
|---|---|---|---|---|
| 5,347,700 | A | * | 9/1994 | Tominaga .............. B23P 21/004 228/101 |
| 5,907,489 | A | * | 5/1999 | Elliott ................. G05B 19/4097 700/103 |
| 6,355,906 | B1 | * | 3/2002 | Okuno ............... B23K 26/0838 219/121.6 |
| 6,378,186 | B1 | | 4/2002 | Angel |
| 7,055,240 | B2 | * | 6/2006 | Kelley ................... B23Q 1/626 269/47 |

(Continued)

FOREIGN PATENT DOCUMENTS

| | | |
|---|---|---|
| JP | H06304788 A | 11/1994 |
| JP | 2000-061647 A | 2/2000 |

(Continued)

*Primary Examiner* — Larry E Waggle, Jr.
*Assistant Examiner* — Tyrone V Hall, Jr.
(74) *Attorney, Agent, or Firm* — Mintz Levin Cohn Ferris Glovsky and Popeo, P.C.; Peter F. Corless (57) ABSTRACT

A fixing apparatus for respot welding is provided. The fixing apparatus includes a base plate on which electrically-powered cylinders are mounted, lower pin jigs mounted upright on the electrically-powered cylinders to support a workpiece and the workpiece is fixed at a position by allowing pin units mounted on upper portions of the lower pin jigs to penetrate the workpiece. Further a pressing hanger is positioned to be spaced apart from the upper portions of the lower pin jigs, and moves downward toward the pin units to apply a force to the workpiece when the workpiece is seated on the lower pin jigs.

14 Claims, 12 Drawing Sheets

(56) References Cited

U.S. PATENT DOCUMENTS

| | | | |
|---|---|---|---|
| 8,356,403 B2 * | 1/2013 | Woo ................. | B23P 21/004 228/212 |
| 2003/0115746 A1 | 6/2003 | Saito et al. | |
| 2008/0000068 A1 * | 1/2008 | Savoy ................ | B23P 21/004 29/429 |
| 2008/0000069 A1 * | 1/2008 | Savoy ................ | B62D 65/02 29/430 |
| 2008/0226427 A1 * | 9/2008 | Van Zile ........... | B23K 37/0443 414/14 |
| 2012/0145849 A1 * | 6/2012 | Yeum ................ | B25B 11/02 248/220.21 |
| 2012/0146274 A1 * | 6/2012 | Kim .................. | B62D 65/026 269/61 |
| 2013/0113149 A1 * | 5/2013 | Yeum ................ | B23K 37/0443 269/59 |

FOREIGN PATENT DOCUMENTS

| | | | |
|---|---|---|---|
| KR | 10-0666627 B1 | | 1/2007 |
| KR | 1020050059617 | * | 1/2007 |
| KR | 10-0907057 B1 | | 7/2009 |
| KR | 10-1481486 B1 | | 1/2015 |

* cited by examiner

FIG. 1

RELATED ART

FIG. 2

RELATED ART

FIXING APPARATUS FOR RESPOT WELDING

CROSS-REFERENCE TO RELATED APPLICATION

This application claims under 35 U.S.C. §119 a the benefit of Korean Patent Application No. 10-2015-0123726 filed on Sep. 1, 2015, the entire contents of which are incorporated herein by reference.

BACKGROUND

(a) Technical Field

The present disclosure relates to a fixing apparatus for respot welding and more particularly, to a fixing apparatus capable of securely fixing vehicle body components during respot welding.

(b) Background Art

Generally, vehicle manufacturers produce vehicles by subjecting about twenty thousand to thirty thousand components to numerous assembly and welding processes through mass-production lines. In particular, for door components that constitute a vehicle body, the welding work is primarily performed by key welding, and thereafter, respot welding work is secondarily performed to enhance coupling strength between components.

Figure 1:
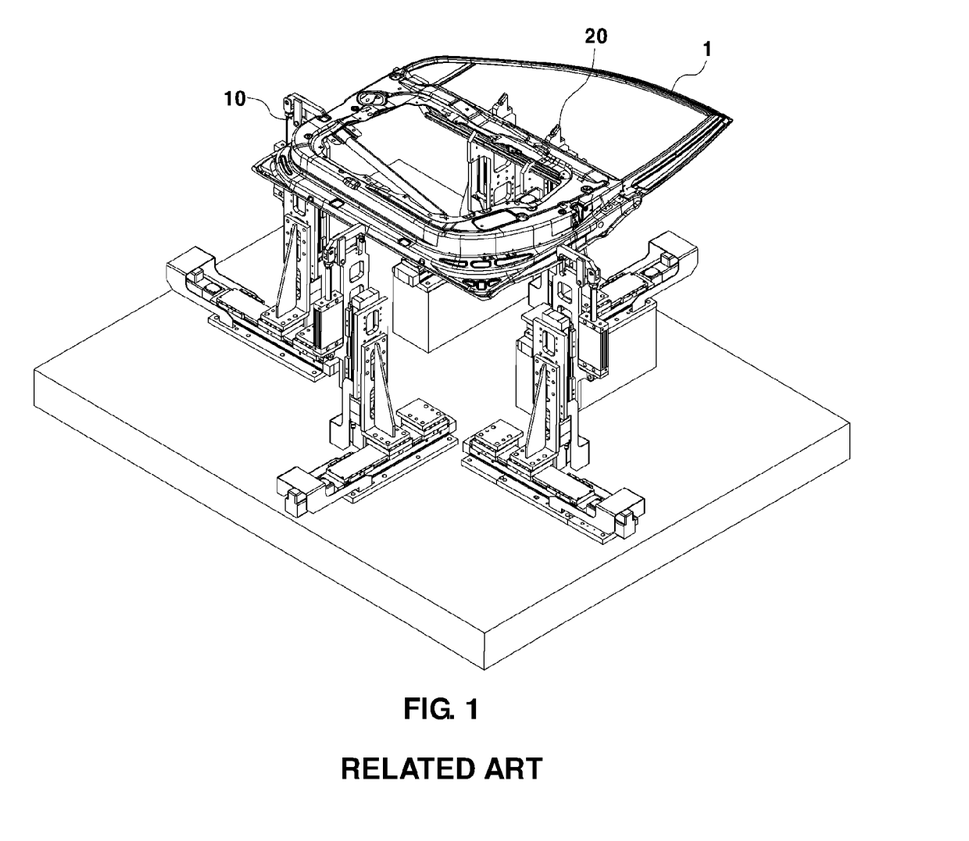
FIG. 1 is an exemplary view illustrating a respot jig according to the related art.
Figure 2:
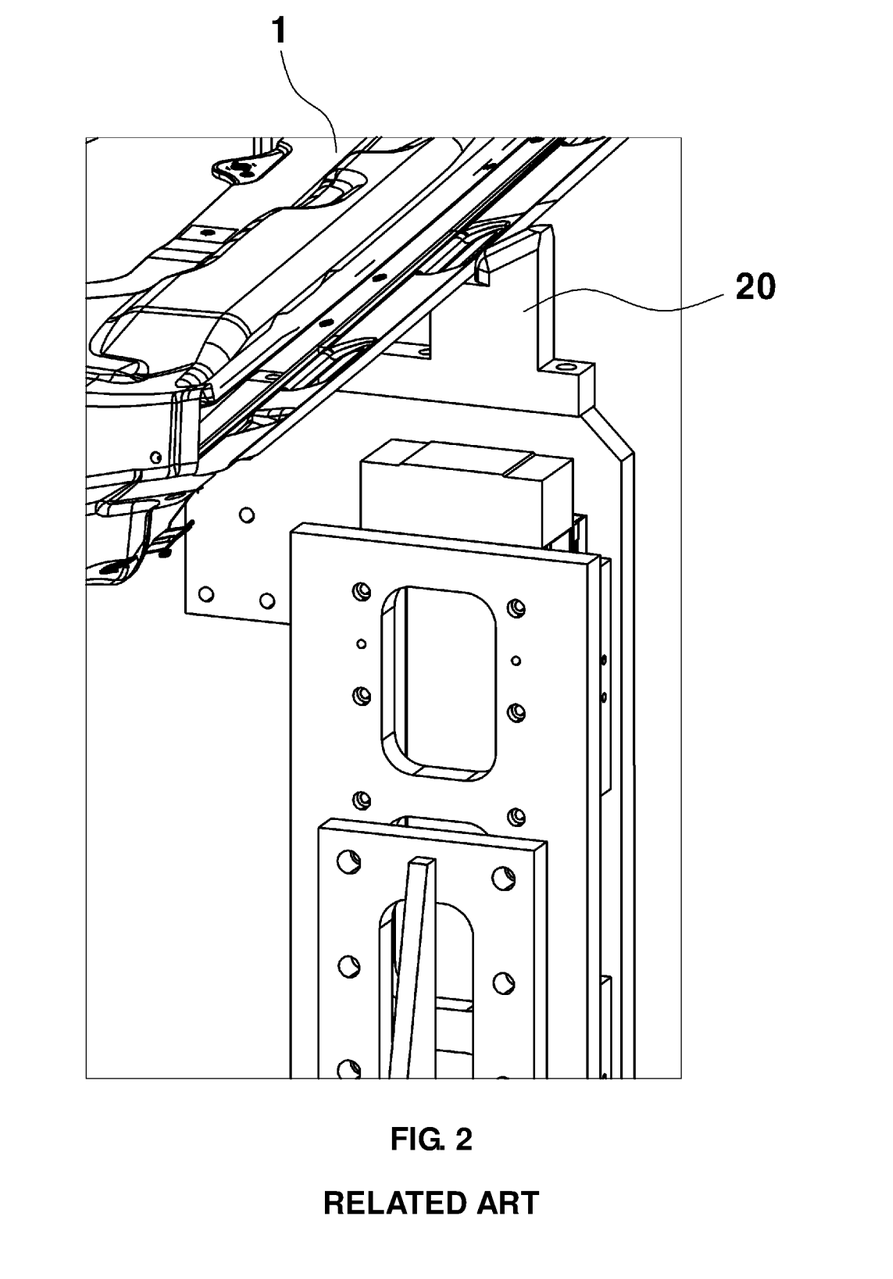
FIG. 2 is an exemplary view illustrating a guide block for the respot jig according to the related art.

For example, during the respot welding process, to the position of the door components should first be arranged in a particular position on a base plate, and then to securely fix the door components to prevent the door components from moving. However, a plurality of component restricting clamps 10, and guide block 20 or guide pins should be provided as illustrated in FIG. 1, and as illustrated in FIG. 2 of the related art. In particular, the guide block 20, among the above components, merely serves to support a workpiece 1 formed as a door component, but cannot maintain the position (e.g., hold) the workpiece 1, and as a result, fixing the workpiece 1 to a predetermined position may be difficult.

The above information disclosed in this section is merely for enhancement of understanding the background of the invention and therefore it may contain information that does not form the prior art that is already known in this country to a person of ordinary skill in the art.

SUMMARY

The present invention provides a fixing apparatus for respot welding, for securely fixing vehicle body components during respot welding. In one exemplary embodiment a fixing apparatus for respot welding, may include a base plate on which electrically-powered cylinders are mounted lower pin jigs mounted upright on the electrically-powered cylinders to support a workpiece, and fixing a position of the workpiece by allowing pin units mounted on upper portions of the lower pin jigs to penetrate the workpiece. A pressing hanger may be positioned to be spaced apart from the upper portions of the lower pin jigs, and may move downward toward the pin units to apply a force to (e.g., press) the workpiece when the workpiece is seated on the lower pin jigs.

In another exemplary embodiment, the base plate may be formed in a quadrangular shape, and the electrically-powered cylinders may be mounted at corners of the base plate, respectively. The electrically-powered cylinder may include a first electrically-powered cylinder mounted on the base plate in a horizontal direction; and a second electrically-powered cylinder mounted in a direction that intersects with the direction of the first electrically-powered cylinder and have the lower pin jigs uprightly coupled thereto. The lower pin jigs may include a body unit that has a pre-determined length may be uprightly mounted upright on the electrically-powered cylinder and a support unit may be coupled to the body unit by a rail and may move upward and downward (vertically) in a longitudinal direction of the body unit. The pin unit may protrude at an upper side of the support unit.

The pressing hanger may include a frame formed to have a size and a shape that corresponds to the base plate, a guide mounted at a corner of a lower portion of the frame that has a pre-determined length in a vertical direction; and an aperture bracket coupled to the guide. Further, one end that faces the support unit may include a coupling aperture into which the pin unit may be inserted. The aperture bracket may include insertion members disposed within installation apertures formed in the coupling aperture in a horizontal direction positioned adjacent to each other, and slide in the horizontal direction to be selectively inserted into fastening grooves formed in an exterior circumferential surface of the pin unit. Elastic members may be disposed within the installation apertures, and may transmit a compression force to the insertion members by elastic force. The guide members may be coupled to the insertion members within the installation apertures, and may guide the sliding movement of the insertion members caused by the elastic members.

The aperture bracket may further include an electromagnet mounted within a partition region formed in the installation aperture. The elastic member may selectively apply a force to the insertion member based on engagement or disengagement (e.g., turned on or off) of a power source. The aperture bracket may further include a detecting sensor mounted at an upper side of the coupling aperture, and configured to detect the insertion of the pin unit. The detecting sensor may be connected with the power source that supplies power to the electromagnet, and disengages the power applied to the electromagnet upon insertion of the pin unit into a predetermined position of the coupling aperture. The detecting sensor may be formed as an ultrasonic sensor. The pressing hanger may further include moving units mounted on a lower portion of the frame, and configured to move the guides coupled to the moving units to position the aperture brackets to correspond to the pin units. The moving unit may include a first moving portion mounted at a corner of the lower portion of the frame in a horizontal direction and a second moving portion mounted at a lower side of the first moving portion in a direction that intersects with the direction of the first moving portion, and to which the guide is uprightly coupled.

The pressing hanger may further include a fastening mount mounted on an upper portion of the frame to couple the pressing hanger to a robot arm that moves the frame vertically. The fastening mount may be fastened to the robot arm that moves the frame upward and downward. Furthermore, one end of the pin unit, directed toward the pressing hanger, may be formed in a conical shape.

The present invention has an effect in that during respot welding, a target component may be securely fixed in a given position by a coupling structure for the lower pin and the aperture bracket, and as a result, the respot welding may be more ably performed. Since the lower pin may be moved by the electrically-powered cylinder based on the size of the target component, and the aperture bracket coupled to the lower pin may also be moved to correspond to the movement of the lower pin, the position of the target component may be securely fixed regardless of a dimension of the target component.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Reference numerals set forth in the Drawings include reference to the following elements as further discussed below:

1: workpiece
10: component restricting clamp
20: guide block
100: base plate
110: electrically-powered cylinder
112: first electrically-powered cylinder
114: second electrically-powered cylinder
200: lower pin jig
200a: pin unit
210: body unit
220: support unit
300: pressing hanger
310: frame
320: guide
330: aperture bracket
330a: coupling aperture
330b: installation aperture
332: insertion member
334: elastic member
336: guide member
338: electromagnet
339: detecting sensor
340: moving unit
342: first moving portion
344: second moving portion
350: fastening mount
400: robot arm
A: partition region
H: fastening groove It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 3:
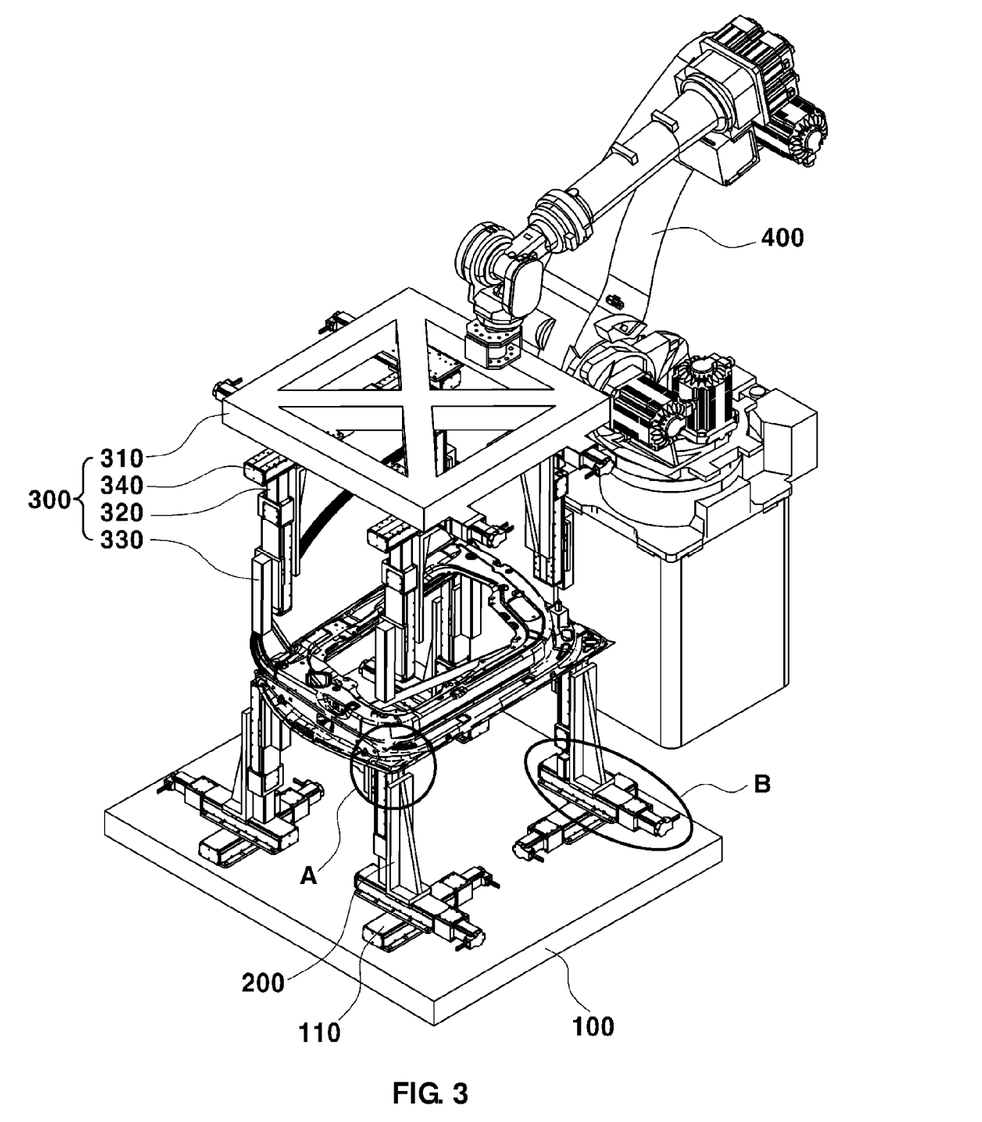
FIG. 3 is an exemplary view schematically illustrating a fixing apparatus for respot welding according to an exemplary embodiment of the present invention.
Figure 4:
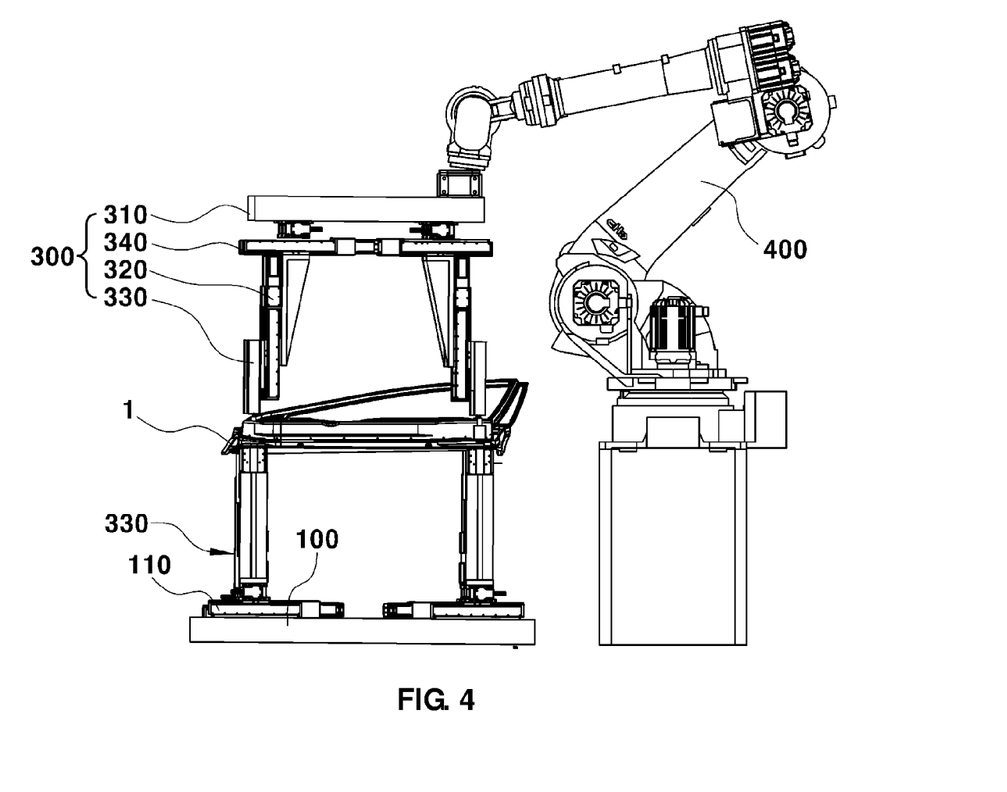
FIG. 4 is an exemplary view illustrating a workpiece pressed by the fixing apparatus for respot welding according to the exemplary embodiment of the present invention.
Figure 5:
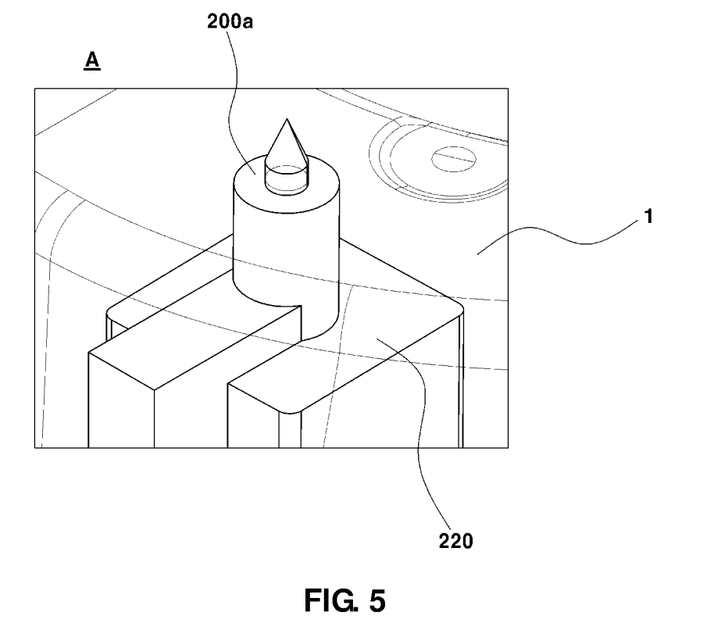
FIG. 5 is an exemplary enlarged view of region A of the fixing apparatus for respot welding according to the exemplary embodiment of the present invention.
Figure 6:
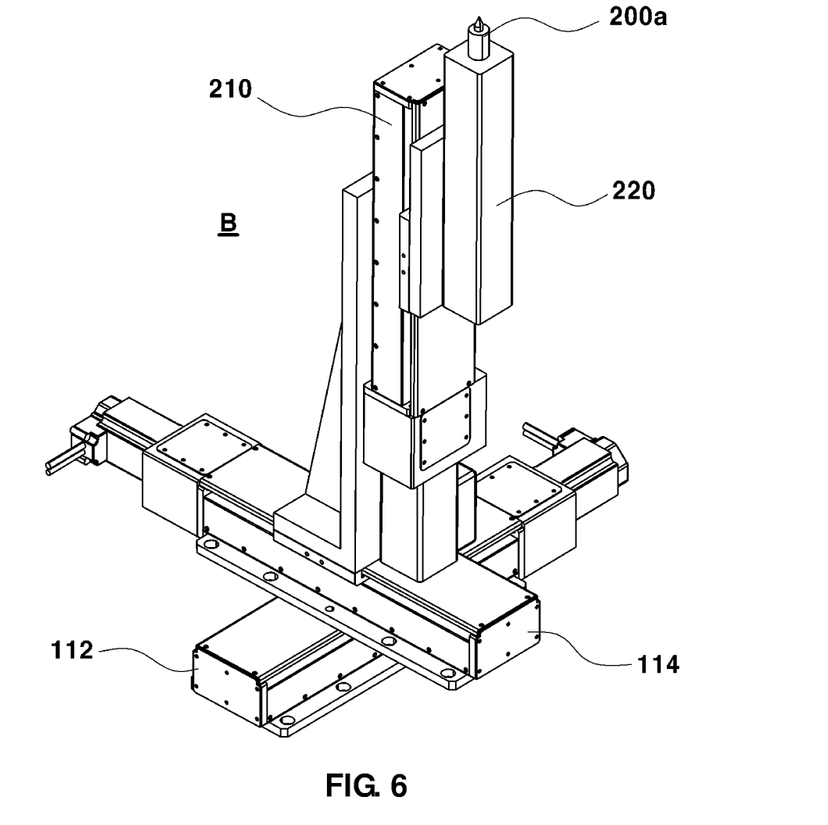
FIG. 6 is an exemplary enlarged view of region B of the fixing apparatus for respot welding according to the exemplary embodiment of the present invention.

FIG. 3 is an exemplary view schematically illustrating a fixing apparatus for respot welding according to an exemplary embodiment of the present invention. FIG. 4 is an exemplary view illustrating a workpiece compressed (e.g., pressed) by the fixing apparatus for respot welding according to the exemplary embodiment of the present invention. FIG. 5 is an exemplary enlarged view of region A of the fixing apparatus for respot welding according to the exemplary embodiment of the present invention. FIG. 6 is an exemplary enlarged view of region B of the fixing apparatus for respot welding according to the exemplary embodiment of the present invention.

As illustrated in FIG. 3, a fixing apparatus for respot welding may include a base plate 100, lower pin jigs 200, and a pressing hanger 300. In particular, electrically-powered cylinders 110 may be mounted on the base plate 100. The base plate 100 may be formed in a quadrangular shape having a predetermined thickness, and the electrically-powered cylinders 110 may be mounted at respective corners of the base plate 100. The base plate 100 may have a first electrically-powered cylinder 112 and a second electrically-powered cylinder 114.

The first electrically-powered cylinder 112 may be mounted on the base plate 100 in a horizontal direction, and may enable the lower pin jigs 200 to move in the horizontal direction. The second electrically-powered cylinder 114 may be mounted at an upper side of the first electrically-powered cylinder 112 in a direction that intersects with the direction of the first electrically-powered cylinder 112. For example, the lower pin jigs 200 may be uprightly coupled to the second electrically-powered cylinder 114, and the position of the lower pin jigs 200 may be minutely adjusted in a front and rear direction and in a left and right direction by operations of the first electrically-powered cylinder 112 and the second electrically-powered cylinder 114. Therefore, since the position of the lower pin jigs 200 may be minutely adjusted as the second electrically-powered cylinder 114 is operated together with the first electrically-powered cylinder 112 to correspond to the size of the lower pin jigs 200, a workpiece 1 may be disposed in a given position regardless of a dimension of the workpiece 1.

The lower pin jigs 200 may be uprightly mounted on the electrically-powered cylinder 110 mounted at the corner of the base plate 100 to support the workpiece 1, and may allow a pin unit 200a mounted at an upper side of the lower pin jigs 200 to penetrate the workpiece 1. The position of the workpiece 1 may be fixed on the base plate 100. In other words, the lower pin jigs 200 may be mounted upright at the corner of the base plate 100 and may have a predetermined length. As illustrated in FIG. 5, the pin unit 200a may penetrate a pierced aperture (not illustrated) in the workpiece 1 formed as a door component, to fix the position of the workpiece 1 to a predetermined height.

In particular, as illustrated in FIG. 6, the lower pin jigs 200 may include a body unit 210 and a support unit 220. The body unit 210 may be mounted upright at the upper side of the electrically-powered cylinder 110 while having a predetermined length. Therefore, the body unit 210 may be moved on the base plate 100 in the front and rear direction and in the left and right direction based on the operations of the first electrically-powered cylinder 112 and the second electrically-powered cylinder 114. The support unit 220 may be coupled to the body unit 210 by a rail, and may move vertically in a longitudinal direction of the body unit 210, and the pin unit 200a may be formed to protrude at an upper side of the support unit 220. The support unit 220 may be a member that directly supports the workpiece 1, and may move vertically on the body unit 210 to allow the workpiece 1 to be disposed in parallel with the base plate 100. The support unit 220 may fix the position of the workpiece 1 to a predetermined height using the pin unit 200a.

Furthermore, the pressing hanger 300 may be positioned to be spaced apart from the upper side of the lower pin jigs. For example, when the workpiece 1 is seated on the lower pin jigs 200, the pressing hanger 300 may move downward toward the pin unit 200a to apply a force to the workpiece 1, thereby allowing the workpiece 1 to be securely fixed on the base plate 100. A fastening mount 350 may be mounted on an upper portion of the pressing hanger 300 to fasten the pressing hanger 300 to a robot arm 400. For example, when the robot arm 400 is coupled to the fastening mount 350, the pressing hanger 300 may move vertically or move to a predetermined position by the robot arm 400.

Therefore, as illustrated in FIG. 4, the pressing hanger 300 may be coupled to the lower pin jigs 200 by the vertical movement of the robot arm 400. Accordingly, the workpiece 1 may be securely fixed prior to performing respot welding by compression of the upper portion of the workpiece 1 fixed on the lower pin jigs 200 by the pin units 200a.

Figure 7:
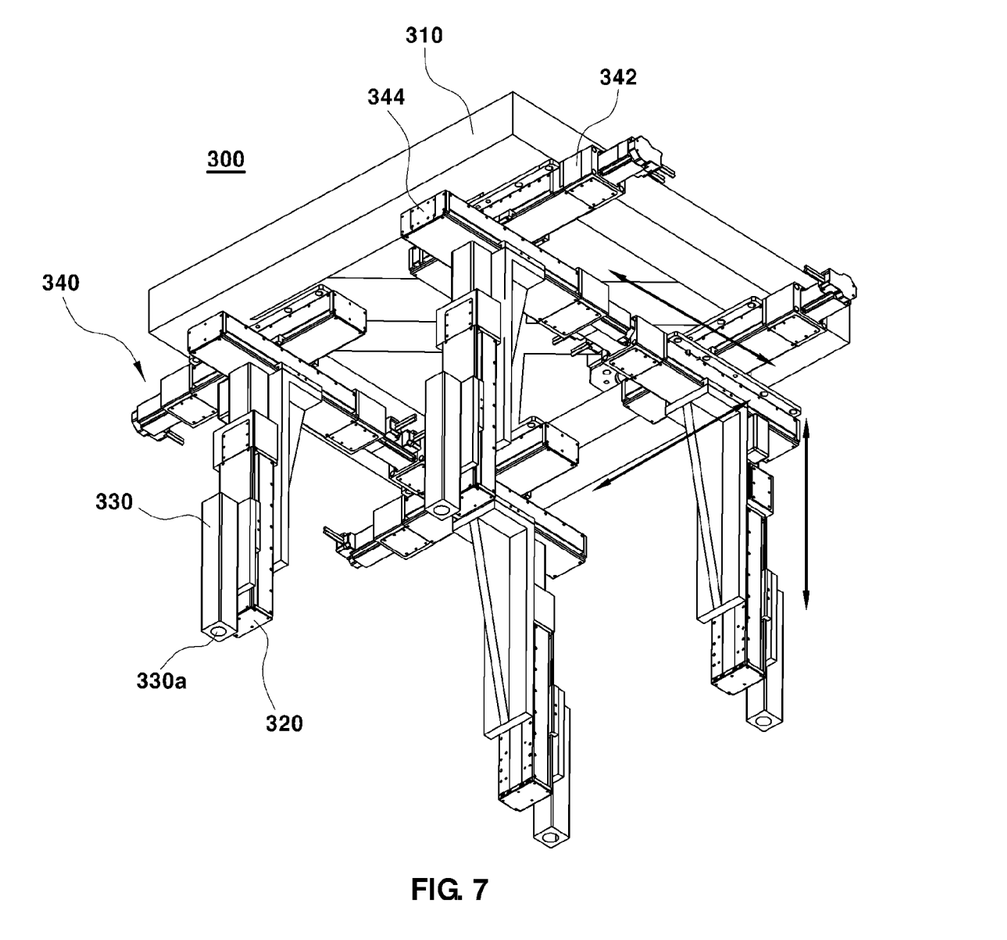
FIG. 7 is an exemplary view illustrating a lower portion of a pressing hanger of the fixing apparatus for respot welding according to the exemplary embodiment of the present invention.
Figure 8:
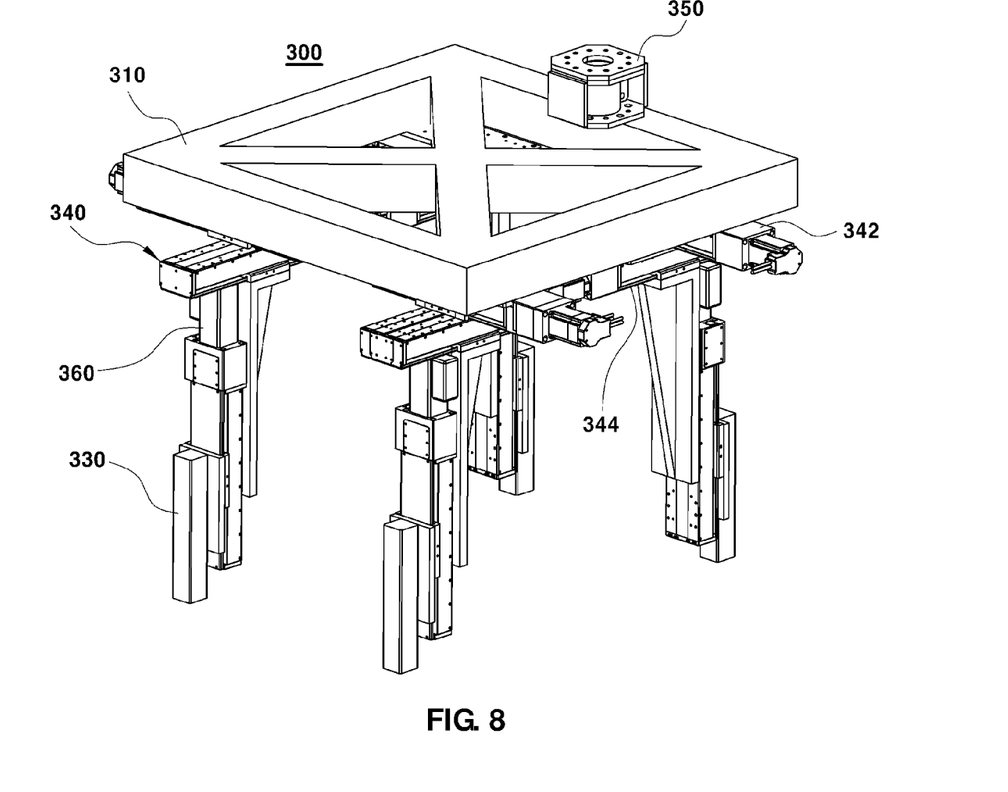
FIG. 8 is an exemplary view illustrating an upper portion of a pressing hanger of the fixing apparatus for respot welding according to the exemplary embodiment of the present invention.

Hereinafter, FIG. 7 provides an exemplary view that illustrates a lower portion of a pressing hanger of the fixing apparatus for respot welding according to the exemplary embodiment of the present invention. FIG. 8 provides an exemplary view that illustrates an upper portion of a pressing hanger of the fixing apparatus for respot welding according to the exemplary embodiment of the present invention. As illustrated in FIGS. 7 and 8, the fixing apparatus for respot welding may include the pressing hanger 300 that moves downward toward the pin units 200a to apply a force to the workpiece 1 when the workpiece 1 is seated on the lower pin jigs 200.

The pressing hanger 300 may include a frame 310, guides 320, and aperture brackets 330. The frame 310 may be formed to have a size and a shape that correspond to a size and a shape of the base plate 100. The guides 320 may be mounted at corners of a lower portion of the frame 310 while having a length in a vertical direction. The aperture bracket 330 may be coupled to the guide 320, and a coupling aperture 330a into which the pin unit 200a may be inserted is provided at one end positioned adjacent to the support unit 220. The aperture bracket 330 may have about the same size and shape as the support unit 220, and may be positioned adjacent to one end of the support unit 220 when the frame 310 is moved downward. The workpiece 1 may be fixed by pressing the upper portion of the workpiece 1 penetrated by the pin units 200a.

Furthermore, the pressing hanger 300 may further include moving units 340 mounted on the lower portion of the frame 310, that move the guides 320, that may be vertically coupled to the moving units 340. The aperture brackets 330 may be positioned to correspond to the pin units 200a. In other words, the moving unit 340 may have a first moving portion 342, and a second moving portion 344. The first moving portion 342 may correspond to the first electrically-powered cylinder 112, and may be mounted at the corners of the lower portion of the frame 310 in the horizontal direction, respectively.

The second moving portion 344 may be mounted at a lower side of the first moving portion 342 in a direction that intersects with the direction of the first moving portion 342. The guide 320 may be uprightly coupled to the second moving portion 344. The second moving portion 344 may corresponds to the second electrically-powered cylinder 114, and may allow the guide 320 to move in a direction about the same as a direction in which the body unit 210 moves by the second electrically-powered cylinder 114. For example, both the second moving portion 344 and the first moving portion 342 may be formed as an electrically-powered cylinder, and may allow the guide 320 and the body unit 210 to be positioned at about the same position by the operations of the first moving portion 342 and the second moving portion 344. The aperture bracket 330 including the coupling aperture 330a and the support unit 220 including the pin unit 200a may be positioned in the same line.

Figure 9:
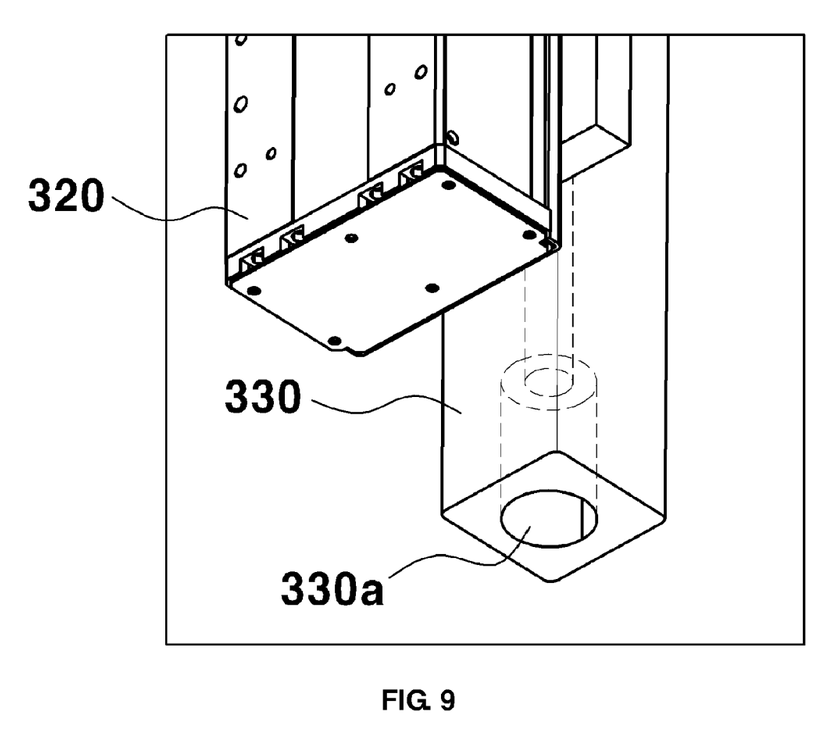
FIG. 9 is an exemplary view illustrating a wheel bracket of the pressing hanger of the fixing apparatus for respot welding according to the exemplary embodiment of the present invention.
Figure 10:
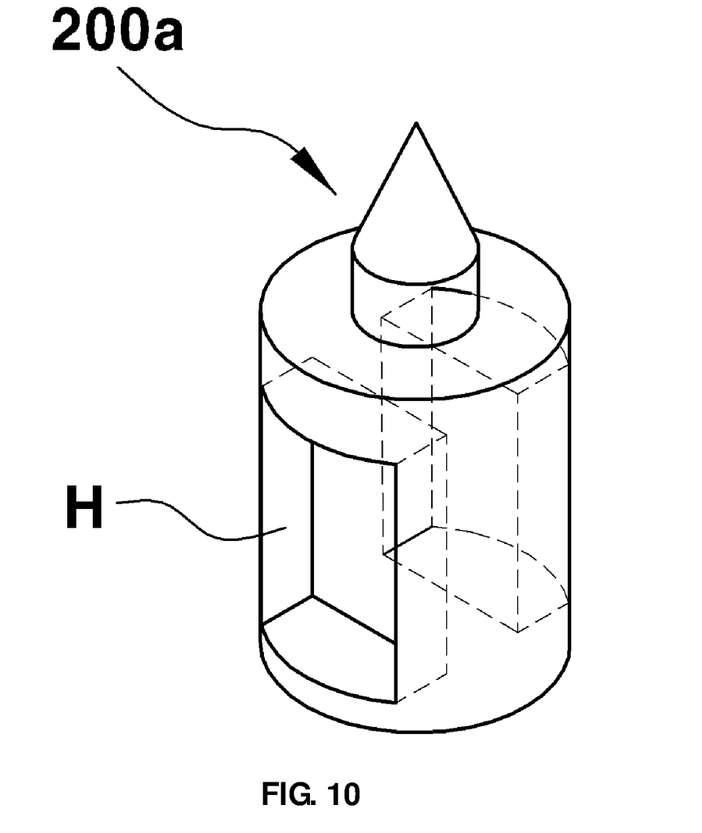
FIG. 10 is an exemplary view illustrating a pin unit of the fixing apparatus for respot welding according to the exemplary embodiment of the present invention.
Figure 11:
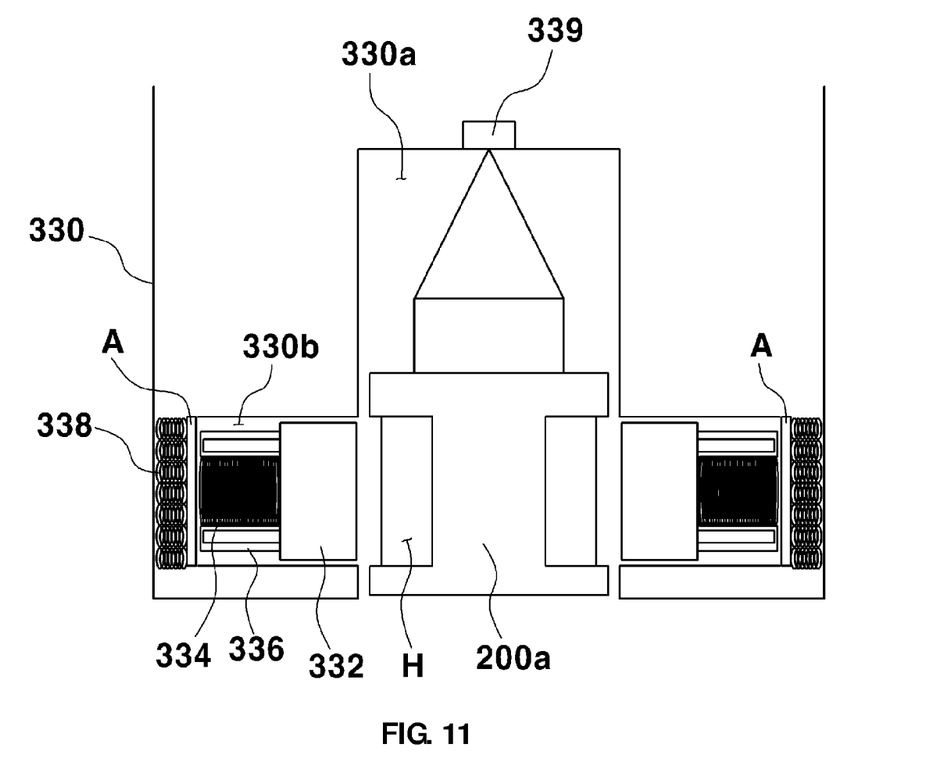
FIG. 11 is an exemplary view illustrating an interior of an installation aperture of the wheel bracket of the fixing apparatus for respot welding according to the exemplary embodiment of the present invention.
Figure 12:
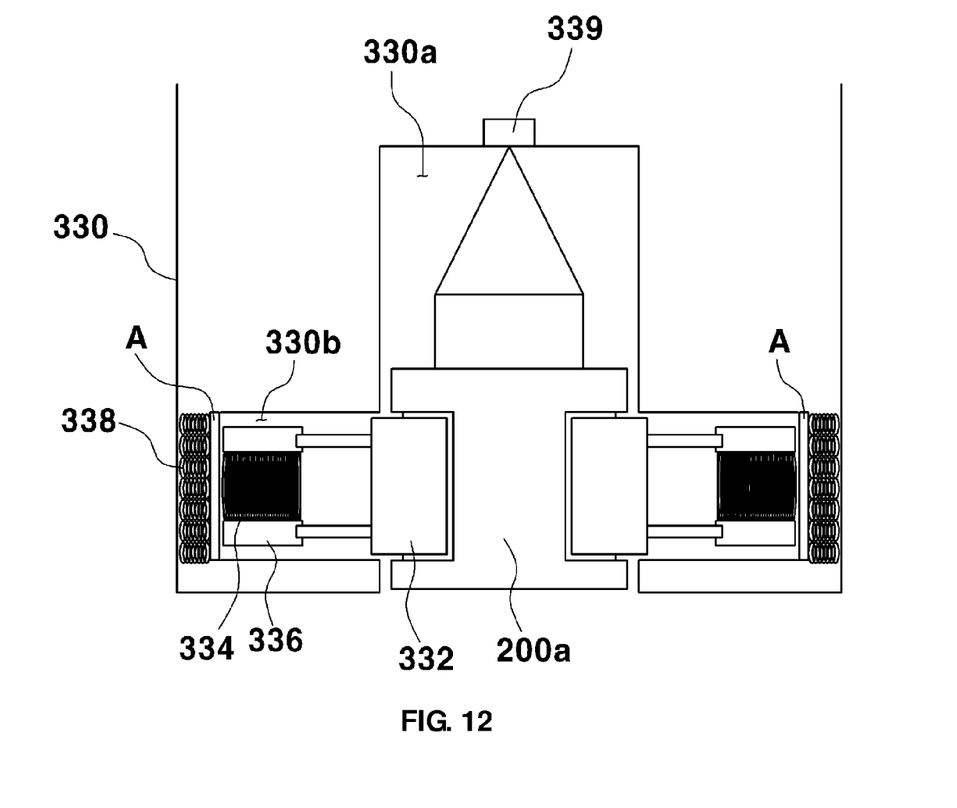
FIG. 12 is an exemplary view illustrating an operation of an insertion member of the wheel bracket of the fixing apparatus for respot welding according to the exemplary embodiment of the present invention.

Hereinafter, FIG. 9 is an exemplary view that illustrates a wheel bracket of the pressing hanger of the fixing apparatus for respot welding according to the exemplary embodiment of the present invention. FIG. 10 is an exemplary view that illustrates a pin unit of the fixing apparatus for respot welding according to the exemplary embodiment of the present invention. FIG. 11 is an exemplary view that illustrates an interior of an installation aperture of the wheel bracket of the fixing apparatus for respot welding according to the exemplary embodiment of the present invention. FIG. 12 is an exemplary view that illustrates an operation of an insertion member of the wheel bracket of the fixing apparatus for respot welding according to the exemplary embodiment of the present invention.

As illustrated in FIG. 9, the fixing apparatus for respot welding may include the pressing hanger 300. The pressing hanger 300 may include the aperture bracket 330. The coupling aperture 330a into which the pin unit 200a is inserted may be disposed one end of the aperture bracket 330 positioned adjacent to the support unit 220. The aperture bracket 330 may allow the pin unit 200a inserted into the coupling aperture 330a to be fixed. In other words, one end of the pin unit 200a may be formed in a conical shape, and fastening grooves H may be formed in an exterior circumferential surface of the pin unit 200a as illustrated in FIG. 10. For example, the insertion members 332 may be selectively inserted into the fastening grooves H within the coupling aperture 330a, thereby effectively fixing the pin unit 200a within the coupling aperture 330a.

Furthermore, as illustrated in FIG. 11, the aperture bracket 330 may include the insertion members 332, elastic members 334, and guide members 336. The insertion members 332 may be disposed within installation apertures 330b, formed in the horizontal direction, positioned adjacent to each other within the coupling aperture 330a. The insertion members 332 slide in the horizontal direction, and may be selectively inserted into the fastening apertures H formed in the exterior circumferential surface of the pin unit 200a. The elastic member 334 may be disposed within installation aperture 330b, and may transmit a compression force to the insertion member 332 by elastic force. The guide member 336 may be coupled to the insertion member 332 disposed within installation aperture 330b, and may be configured to actuate (e.g., guide) the sliding movement of the insertion member 332, that may be configured to be actuated by the elastic member 334. In other words, when a power source, configured to supply power to an electromagnet 338, is disengaged, the elastic member 334 may press (e.g., exert pressure onto) the insertion member 332 while returning to an initial position. Accordingly the guide member 336 may extend in length, thereby guiding the sliding movement of the insertion member 332.

The electromagnet 338 may be disposed within a partition region A formed in the installation aperture 330b, and may allow the elastic member 334 to selectively apply a force to the insertion member 332 based on engagement or disengagement of the power source. In other words, power may be applied to the electromagnet 338 to contract the elastic member 334, and as a result, the insertion member 332 may be disposed within the installation aperture 330b.

For example, when the pin unit 200a is inserted into a predetermined position of the coupling aperture 330a by the downward movement of the pressing hanger 300, the power may be disengaged to prevent application to the electromagnet 338. Accordingly the elastic member 334 does not contract any further and returns to the initial position to allow the insertion member 332 to be inserted into the fastening grooves H of the pin unit 200a, as illustrated in FIG. 12. In particular, a detecting sensor 339 may be configured to determine insertion of the pin unit 200a into a predetermined position of the coupling aperture 330a.

The detecting sensor 339 may be an ultrasonic sensor configured to measure the time until the detecting sensor 339 receives a reflected wave from the pin unit 200a after transmitting an ultrasonic wave to the pin unit 200a. Further, the detecting sensor may be configured to determine whether the pin unit 200a is inserted into the coupling aperture 330a, but other sensors may be used for the same purpose. The detecting sensor 339 may be connected with a separate power source (not illustrated) that supplies power to the electromagnet 338, and mounted at an upper side of the coupling aperture 330a and configured to detect whether the pin unit 200a is inserted into the coupling aperture 330a. In other words, when the pin unit 200a has been inserted into the coupling aperture 330a, one end of the pin unit 200a has reached the predetermined position in the coupling aperture 330a, the detecting sensor 339 may allow power applied to the electromagnet 338 to be disengaged. The, elastic member 334 then provides a compression force to the insertion member 332.

Therefore, the pin unit 200a may be inserted into the coupling aperture 330a which may be detected by the detecting sensor 339. Accordingly, the power to the electromagnet 338 may be selectively cut off based on the insertion of the pin unit 200a to allow the insertion member 332 to slide, having one end of the insertion member 332 inserted into the fastening grooves H of the pin unit 200a. Consequently, in the present exemplary embodiment, as disclosed in the detailed description described above with reference to FIG. 4, when the pressing hanger 300 moves downward by the robot arm 400 and then coupled to the lower pin jigs 200, the pin unit 200a may be fixed within the coupling aperture 330a, and the position of the workpiece 1 supported by the lower pin jigs 200 may be fixed in a particular position.

The present invention has an effect in that during respot welding, a target component may be securely fixed in a given position by a coupling structure for the lower pin and the aperture bracket, and, the respot welding may be more easily performed. The present invention provides for movement of the lower pin by the electrically-powered cylinder based on the size of the target component, and the aperture bracket coupled to the lower pin may also be moved to correspond to the movement of the lower pin. Accordingly the position of the target component may be securely fixed regardless of a dimension of the target component.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fixing apparatus for respot welding, comprising:
a base plate on which electrically-powered cylinders are mounted;
lower pin jigs mounted upright on the electrically-powered cylinders to support a workpiece, and fix a position of the workpiece that allow pin units mounted on upper portions of the lower pin jigs to penetrate the workpiece; and
a pressing hanger disposed to be spaced apart from the upper portions of the lower pin jigs, and configured to move downward toward the pin units to apply a force to the workpiece when the workpiece is positioned on the lower pin jigs, the pressing hanger including an aperture bracket having a coupling aperture into which a respective one of the pin units is inserted, wherein the aperture bracket includes:
insertion members disposed within installation apertures formed in the coupling aperture in a horizontal direction adjacent to each other, and configured to slide in the horizontal direction to be selectively inserted into fastening grooves formed in an exterior circumferential surface of the respective one of the pin units;
elastic members disposed within the installation apertures, and configured to transmit a compression force to the insertion members by elastic force; and
guide members coupled to the insertion members in the installation apertures, and configured to guide the sliding movement of the insertion members caused by the elastic members.

2. The fixing apparatus of claim 1, wherein the base plate is formed in a quadrangular shape, and the electrically-powered cylinders are mounted at corners of the base plate, respectively.

3. The fixing apparatus of claim 2, wherein the electrically-powered cylinders include:
a first electrically-powered cylinder mounted on the base plate in a horizontal direction; and
a second electrically-powered cylinder mounted in a direction that intersects with the direction of the first electrically-powered cylinder and have the lower pin jigs uprightly coupled.

4. The fixing apparatus of claim 1, wherein the lower pin jigs include:
a body unit mounted upright on the electrically-powered cylinders while having a length; and
a support unit coupled to the body unit by a rail, and configured to move vertically in a longitudinal direction of the body unit, and has the respective one of the pin units that protrudes from an upper side of the support unit.

5. The fixing apparatus of claim 1, wherein the pressing hanger includes:
a frame formed to have a size and a shape that correspond to the base plate; and
a guide mounted at a corner of a lower portion of the frame while having a length in a vertical direction,
wherein the aperture bracket is coupled to the guide, and includes, at one end facing the support unit, the coupling aperture.

6. The fixing apparatus of claim 5, wherein the pressing hanger further includes:
a moving unit mounted on a lower portion of the frame, and configured to move the guide coupled to the moving unit to a position that the aperture bracket corresponds to the respective one of the pin units.

7. The fixing apparatus of claim 6, wherein the moving unit includes:
a first moving portion mounted at a corner of the lower portion of the frame in a horizontal direction; and
a second moving portion mounted at a lower side of the first moving portion in a direction that intersects with the direction of the first moving portion, and coupled uprightly to the guide.

8. The fixing apparatus of claim 5, wherein the pressing hanger further includes a fastening mount mounted on an upper portion of the frame.

9. The fixing apparatus of claim 8, wherein the fastening mount is coupled to a robot arm that moves the frame vertically.

10. The fixing apparatus of claim 1, wherein the aperture bracket further includes:
an electromagnet disposed within a partition region formed in one of the installation apertures, and configured to allow one of the elastic members to selectively apply a force to one of the insertion members based on whether a power source is engaged or disengaged.

11. The fixing apparatus of claim 10, wherein the aperture bracket further includes:
a detecting sensor mounted at an upper side of the coupling aperture, and configured to detect whether the respective one of the pin units is inserted.

12. The fixing apparatus of claim 11, wherein the detecting sensor is connected with the power source configured to supply power to the electromagnet, and disengages power applied to the electromagnet when the respective one of the pin units is inserted into a predetermined position of the coupling aperture.

13. The fixing apparatus of claim 11, wherein the detecting sensor is formed as an ultrasonic sensor.

14. The fixing apparatus of claim 1, wherein one end of the respective one of the pin units, directed toward the pressing hanger, is formed in a conical shape.

* * * * *